United States Patent [19]
Ishimatsu et al.

[11] Patent Number: 6,048,049
[45] Date of Patent: Apr. 11, 2000

[54] LASER PROCESSING METHOD, AN INK JET RECORDING HEAD, AND A SYSTEM FOR MANUFACTURING INK JET RECORDING HEADS

[75] Inventors: Shin Ishimatsu, Yokohama; Masaki Inaba, Kawasaki; Tsutomu Abe, Isehara; Akira Goto; Masao Furukawa, both of Yokohama; Kouichi Omata, Kawasaki; Toshinori Hasegawa; Miki Ito, both of Yokohama, all of Japan

[73] Assignee: Canon Kabushiki Kaisha, Tokyo, Japan

[21] Appl. No.: 08/947,943

[22] Filed: Oct. 9, 1997

[30] Foreign Application Priority Data

Oct. 16, 1996 [JP] Japan ................................. 8-273493

[51] Int. Cl.$^7$ .................................................. B41J 2/135
[52] U.S. Cl. .............................. 347/45; 347/47; 347/256
[58] Field of Search ................................. 347/45, 47, 56, 347/256, 258

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et aL. | 347/56 |
| 4,558,333 | 12/1985 | Sugitani et al. | 347/65 |
| 4,723,129 | 2/1988 | Endo et al. | 347/56 |
| 4,740,796 | 4/1988 | Endo et al. | 347/56 |
| 5,208,604 | 5/1993 | Watanabe et al. | 347/47 |
| 5,243,755 | 9/1993 | Inaba et al. | 29/890.1 |
| 5,361,087 | 11/1994 | Tajima et al. | 347/44 |
| 5,365,255 | 11/1994 | Inoue et al. | 347/45 |
| 5,594,479 | 1/1997 | Inoue et al. | 347/45 |
| 5,657,539 | 8/1997 | Orikasa et al. | 29/890.1 |

FOREIGN PATENT DOCUMENTS

| | | |
|---|---|---|
| 0488033 | 6/1992 | European Pat. Off. . |
| 0670221 | 9/1995 | European Pat. Off. . |
| 0679469 | 11/1995 | European Pat. Off. . |
| 59-123670 | 7/1984 | Japan . |
| 59-138461 | 8/1984 | Japan . |
| 2-121842 | 5/1990 | Japan . |
| 2-121845 | 5/1990 | Japan . |
| 2-187346 | 7/1990 | Japan . |
| 3-101954 | 4/1991 | Japan . |
| 3-101960 | 4/1991 | Japan . |
| 4-9291 | 1/1992 | Japan . |
| 4-339585 | 11/1992 | Japan . |

Primary Examiner—N. Le
Assistant Examiner—Hai C. Pham
Attorney, Agent, or Firm—Fitzpatrick, Cella, Harper & Scinto

[57] ABSTRACT

A laser processing method comprises at least one of a laser light source, a beam shaping optical system for shaping laser beams, a mask having specific patterns corresponding to the processing configuration of a work, an illumination optical system for illuminating the mask, and a projection optical system for focusing the pattern images of the mask on the processing surface of the work by a specific magnification. This mask is provided with an extinct portion smaller than the quotient of the resolution and specific magnification of the projection optical system. With the method thus arranged, a work can be processed to provide complicated three-dimensional grooves having irregularities in the direction of laser irradiation by one-time processing. Also, the extinct portions make it possible to easily and finely adjust the extinction so that the precision of work processing is enhanced.

11 Claims, 7 Drawing Sheets

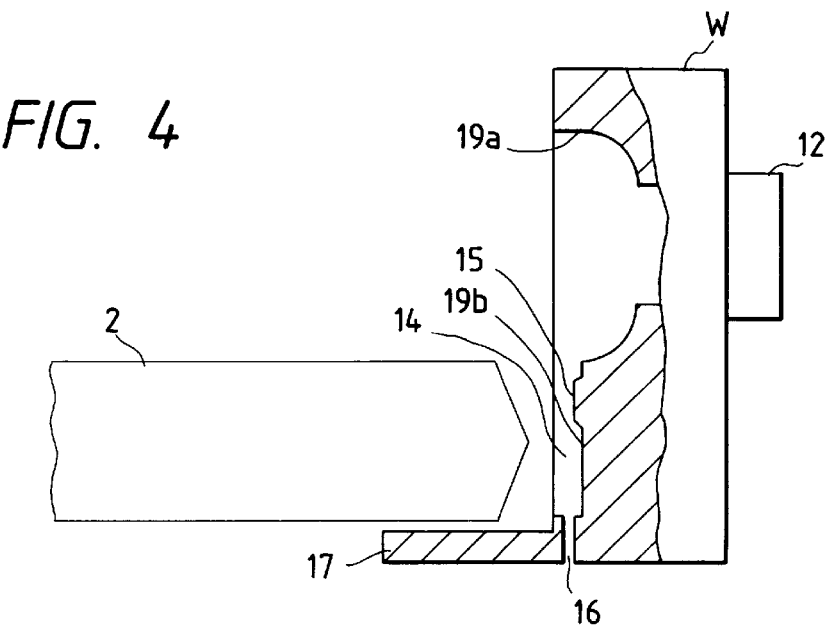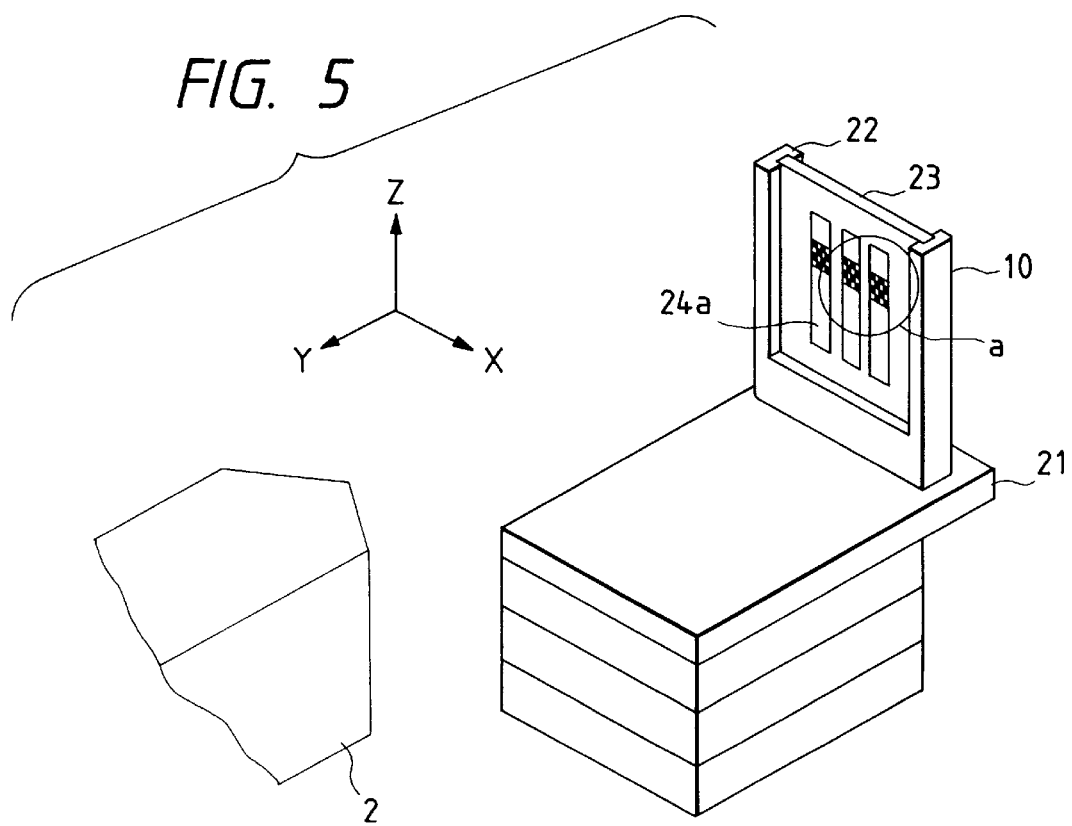

LASER PROCESSING METHOD, AN INK JET RECORDING HEAD, AND A SYSTEM FOR MANUFACTURING INK JET RECORDING HEADS

BACKGROUND OF THE INVENTION

1. Field of the Invention

The present invention relates to a laser processing method, an ink jet recording head, and a system for manufacturing ink jet recording heads.

2. Related Background Art

In recent years, a laser oscillator has been widely used as a light source for a laser processing system. Particularly, a pulse laser oscillator whose range is beyond ultraviolet has attracted attention as a light source for the performance of polymer patterning abrasion without any development process.

As a laser processing method or a laser processing system that processes polymer by the utilization of abrasion, the one, which is provided with a laser light source unit and specific patterns, is proposed. It is further provided with a mask unit having the mask that allows laser beams to be transmitted from the laser light source unit to the work side through the mask; a projection optical system that projects the laser beams from the laser light source unit; and a measurement and movement system that measures the work positions and moves the work accordingly (such as disclosed in the specifications of Japanese Patent Laid-Open Application No. 4-9291 and Japanese Patent Laid-Open Application No. 4-339585).

A laser processing method of the kind is mainly used for minute processing of ink jet openings of an ink jet recording head (see Japanese Patent Laid-Open Application No. 2-121842, Japanese Patent Laid-Open Application No. 2-187346, Japanese Patent Laid-Open Application No. 3-101954, and Japanese Patent Laid-Open Application No. 3-101960), and used for processing ink flow paths of an ink jet recording head (see Japanese Patent Laid-Open Application No. 2-121845) among some others.

The ink jet recording head referred to in this application is adopted particularly for the recording head of bubble jet type among those using the ink jet recording method. The typical structure and operational principle of such method are disclosed in the specifications of U.S. Pat. Nos. 4,723,129 and 4,740,796, for example. This method is applicable to the so-called on-demand type recording system and a continuous type recording system as well. To describe this method in regard to the on-demand type, for example, each of electrothermal transducing devices is arranged for a sheet or a liquid path (ink flow path) that retains liquid (ink), and such electrothermal transducing device is caused to generate thermal energy in accordance with driving signals, thus creating film boiling on the thermal activation surface of a recording head. As a result, each bubble is formed in liquid (ink) one to one in response to each of the driving signals described above. By the development and contraction of each bubble thus created, the liquid (ink) is discharged through a discharge opening in the form of a droplet. The driving signal is more preferably in the form of pulses such as disclosed in the specifications of U.S. Pat. Nos. 4,463,359 and 4,345,262. Also, it is preferable to adopt the temperature increasing rate of the heating surface as disclosed in the specification of U.S. Pat. No. 4,313,124.

The structure of the recording head described above is arranged by combining the ink discharge openings (orifices), linear or right-angled liquid paths (ink flow paths), and electrothermal transducing devices as shown in each of the above-mentioned specifications. Besides, the structure such as disclosed in the specifications of U.S. Pat. Nos. 4,558,333 and 4,459,600 wherein the thermal activation portions are arranged in a curved area may be arranged. In addition, the ink jet recording head described above may be structured as disclosed in Japanese Patent Laid-Open Application No. 59-123670, for example, wherein a common slit is used as the discharging ports for plural electrothermal transducing devices, or as disclosed in Japanese Patent Laid-Open Application No. 59-138461, for example, wherein an aperture for absorbing pressure wave of the thermal energy is formed corresponding to the discharge openings. Here, the ink jet recording heads disclosed in the above specifications are arranged to secure a length that corresponds to a specific width by the combination of plural recording heads. However, it may be possible to arrange the structure so that one recording head is able to deal with a length that corresponds to a specific width (that is, the maximum recordable width of a recording medium that a recording apparatus can handle).

Also, the structure of the ink jet recording head described above may be of an exchangeable chip type or cartridge type provided for the recording head itself, where the head is electrically connected with the apparatus main body (for the operation of the electrothermal transducing devices), and ink is then made suppliable as well.

When a laser processing is executed for the formation of fine grooves such as ink flow paths with respect to the part (work) of an ink jet recording head of the kind, it takes a time for the conventional laser processing method to complete such execution if the grooves are configured three-dimensionally with irregularities in the direction of laser irradiation.

For example, if the configuration of the grooves is three-dimensional such as to confine the supply force of ink toward only the opening side or to provide an extrusion on the midway of each groove to present resistance to the flow of ink, the grooves cannot be formed three-dimensionally by a one-time processing. Here, using two or more kinds of masks a multiple processing should be executed. It requires such processing to take a time so that a problem of lowered productivity should arise.

Further, for the processing at the second time and on, the work should be positioned exactly as it has been positioned for the first processing. This positioning requires a higher precision of the image process to be performed for positioning, as well as for each stage of a work movement system. This requirement naturally brings about a problem that the processing system itself should be built in a larger scale.

When processing the three-dimensional grooves, it is of course possible to adopt a dielectric mask so that a certain percentage of laser beams can be transmitted for processing. However, the dielectric mask itself is expensive, and the 100% reflectance of the laser cannot be obtained, either. Further, it is extremely difficult to form fine and highly precise patterns on the dielectric mask itself. As a result, there is automatically a certain limit in utilizing the dielectric mask.

SUMMARY OF THE INVENTION

With a view to solving these problems encountered in the conventional art, the present invention is designed. It is an object of the invention to provide a laser processing method capable of effectively performing the one-time processing of a work having a three-dimensional configuration with irregularities in the direction of laser irradiation. Also, the present invention is aimed at the provision of a system for manufacturing ink jet recording heads using such laser processing method. It is a further object of the invention to provide an ink jet recording head excellent in the characteristics of ink discharges, which is obtainable by means of such processing method and system of manufacture.

In order to achieve the objectives referred to in the preceding paragraph, the present invention provides the laser processing methods as described in the following paragraphs 1) to 12):

1) A laser processing method comprises at least one of a laser light source; a beam shaping optical system for shaping laser beams; a mask having specific patterns corresponding to the processing configuration of a work; an illumination optical system for illuminating said mask; and a projection optical system for focusing the pattern images of the mask on the processing surface of the work by a specific magnification, this mask being provided with an extinct portion smaller than the quotient of the resolution and specific magnification of the projection optical system (hereinafter referred to as the first method).

2) A laser processing method comprises at least one of a laser light source; a beam shaping optical system for shaping laser beams; a mask having specific patterns corresponding to the processing configuration of a work; an illumination optical system for illuminating the mask; and a projection optical system for focusing the pattern images of the mask on the processing surface of the work by a specific magnification, this mask being provided with an extinct portion smaller than the quotient of the resolution and specific magnification when the work is processed (hereinafter referred to as the second method).

3) According to the first method, a laser processing method is arranged, in which the extinct portion smaller than the quotient of the resolution and specific magnification of the projection optical system is the portion at least reflecting or absorbing the laser beams 100% or only transmitting them having less than the threshold value of laser processing of the work (hereinafter referred to as the third method).

4) According to the second method, a laser processing method is arranged, in which the extinct portion smaller than the quotient of the resolution and the specific magnification at the time of processing the work is the portion at least reflecting or absorbing the laser beams 100% or transmitting them having less than the threshold value of laser processing of the work (hereinafter referred to the fourth method).

5) According to the first method or the second method, a laser processing method is arranged, in which the laser light source is the one emitting ultraviolet pulse laser beams (hereinafter referred to as the fifth method). For the ultraviolet pulse laser, it is possible to use either one of Xe—Cl excimer laser, Kr—F excimer laser, Ar—F excimer laser, the fourth harmonic of YAG laser, mixing waves of the basic wave of YAG laser and the second harmonic, and nitrogen gas laser.

6) According to the first method or the second method, a laser processing method is arranged, in which the work is a second substrate of an ink jet recording head which comprises a first substrate having one or more liquid discharge energy generating devices formed thereon for discharging ink and the second substrate having one or more grooves formed thereon to be ink flow paths, and which is formed by bonding the liquid discharge energy generating devices and grooves in a mode of corresponding with each other, and the processing configuration is the groove configuration of the second substrate (hereinafter referred to as the sixth method).

7) According to the first method or the third method, a laser processing method is arranged, in which the extinct portion smaller than the quotient of the resolution and specific magnification of the projection optical system is a portion existing in the groove pattern of an ink jet recording head formed on the mask (hereinafter referred to as the seventh method).

8) According to the first method or the fourth method, a laser processing method is arranged, in which the extinct portion smaller than the quotient of the resolution and specific magnification at the time of processing the work is a portion existing in the groove pattern of an ink jet recording head formed on the mask (hereinafter referred to as the eighth method).

9) According to the seventh method, a laser processing method is arranged, in which the extinct portion smaller than the quotient of the resolution and specific magnification of the projection optical system is a portion arranged irregularly and existing in the groove pattern of an ink jet recording head formed on the mask (hereinafter referred to as the ninth method).

10) According to the eighth method, a laser processing method is arranged, in which the extinct portion smaller than the quotient of the resolution and specific magnification at the time of processing the work is a portion irregularly arranged and existing in the groove pattern of an ink jet recording head formed on the mask (hereinafter referred to as the tenth method).

11) According to the seventh method, a laser processing method is arranged, in which the extinct portion smaller than the quotient of the resolution and specific magnification of the projection optical system is a portion arranged using the fixed binarization method and/or the adaptational binarization method and existing in the groove pattern of an ink jet recording head formed on the mask (hereinafter referred to as the eleventh method).

12) According to the eighth method, a laser processing method is arranged, in which the extinct portion smaller than the quotient of the resolution and specific magnification at the time of processing the work is a portion arranged using the fixed binarization method and/or the adaptational binarization method and existing in the groove pattern of an ink jet recording head formed on the mask (hereinafter referred to as the twelfth method).

Also, a system for manufacturing ink jet recording heads provided by the present invention is capable of executing the first method to the twelfth method described in the preceding paragraphs.

Further, an ink jet recording head provided by the present invention is manufactured by processing the grooves thereof that become ink flow paths using either one of the first method to twelfth method or the system for manufacturing ink jet recording heads described above.

The extinct portion smaller than the resolution and specific magnification of the aforesaid projection optical system arranged for the mask in accordance with the present invention is not focused on a work. However, it can reliably weaken the power of laser beams.

Therefore, in accordance with the present invention, the power of laser processing can be set freely on a work depending on the arrangement of the extinct portions, making it possible to define a work as a complicated three-dimensional configuration having irregularities in the direction of laser irradiation.

Further, in accordance with the present invention, it is possible to form by one-time processing a complected three-dimensional configuration having irregularities in the direction of laser irradiation on a work by use of the mask described above. Also, the inclined surface can be made smoothly without any steps. Therefore, the system of manufacture can be structured simply.

Also, the extinct portion smaller than the quotient of the resolution and specific magnification at the time of processing a work functions in the same way.

Further, in accordance with the present invention, it is possible to arrange the extinct portions for the mask arbitrarily. Therefore, when a work is the second substrate of an ink jet recording head, the ink flow paths having complicated three-dimensional configuration can be formed for the work in good precision for controlling the flow of ink. As a result, in accordance with the present invention, it is possible to obtain an ink jet recording head having excellent characteristics of ink discharges.

BRIEF DESCRIPTION OF THE DRAWINGS

FIG. 4 is a partially sectional view which shows the essential processing points of the second substrate (work) represented in FIG. 2 and FIG. 3.

FIG. 5 is a perspective view which shows the mask unit of the laser processing system represented in FIG. 1.

DETAILED DESCRIPTION OF THE PREFERRED EMBODIMENTS

Hereinafter, with reference to the accompanying drawings, the description will be made of the present invention in accordance with the embodiments thereof.
(Embodiment 1)

Figure 1:
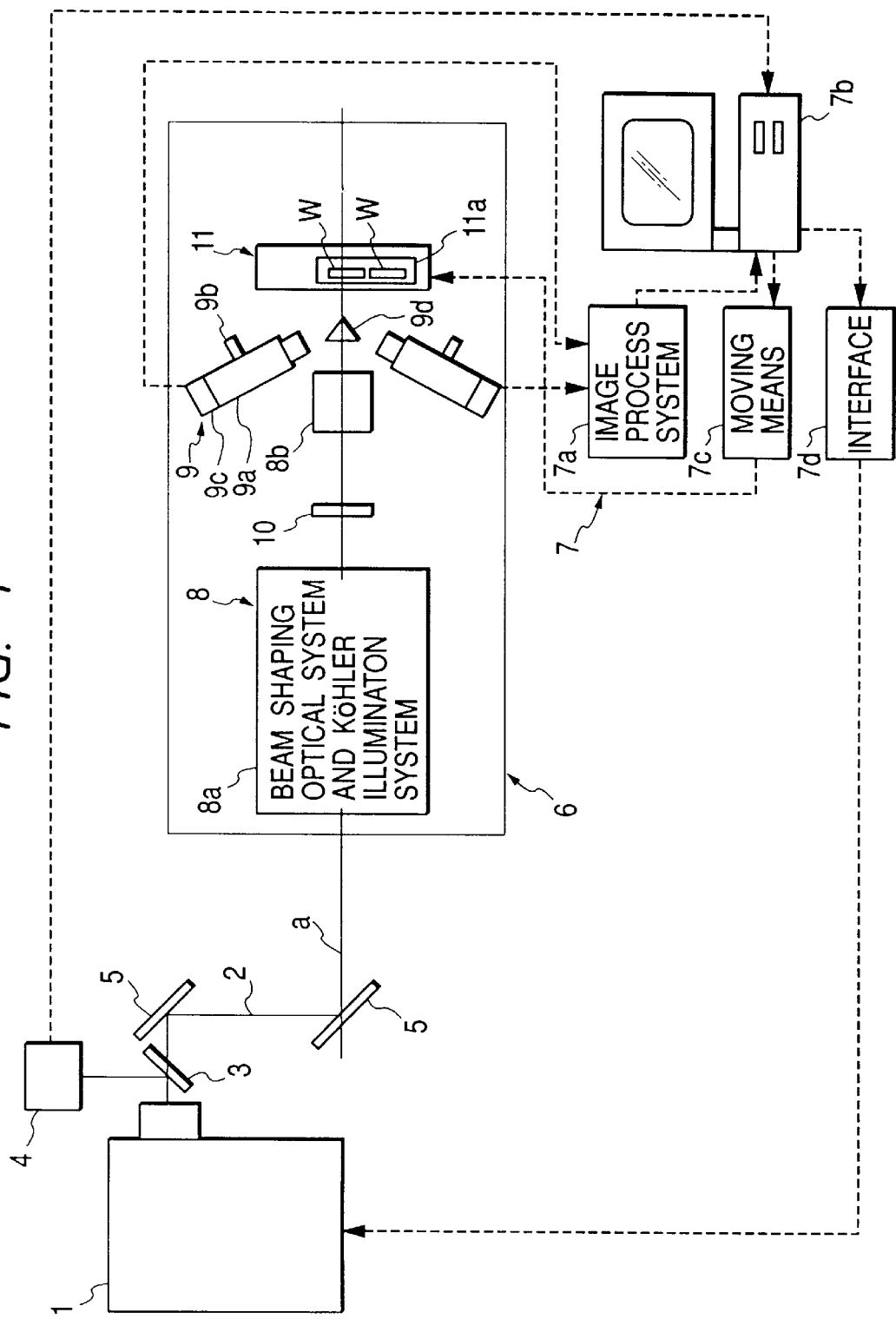
FIG. 1 is a view which schematically illustrates the structure of a laser processing system that implements the laser processing method in accordance with a first embodiment of the present invention.

FIG. 1 is a structural view schematically showing a laser processing system that implements a laser processing method in accordance with a first embodiment of the present invention. As shown in FIG. 1, the laser processing system comprises a laser oscillator 1 serving as the laser light source that emits laser beams 2; the apparatus frame 6 which is provided with the processing system that processes a work W by means of laser beams received from the laser oscillator 1; and an information processing and controlling system 7 that performs information processing and controlling of the process of the work W.

The laser beams 2 emitted from the laser oscillator 1 are partially reflected by a beam splitter 3, and the reflected beams are monitored by means of a power detector 4. On the other hand, the laser beams that transmit the beam splitter 3 are reflected by two 45-degree total reflection mirrors 5 and are incident upon the apparatus frame 6. The beam splitter 3 is formed by paralleled flat plates of synthetic quartz in order to separate a part of laser beams 2 only by means of the surface reflection thereof.

The apparatus frame 6 comprises an optical system 8; an observation and measurement system 9 that observes and measures the positions of a work W; a mask unit 10; and a work station 11 that enables the work W to be moved. The optical system 8 is provided with a beam shaping optical system and Koehler illumination system 8a, and a projection optical system 8b that enables the image on the mask unit 10 to be focused on the processing surface of a work W. These systems are arranged on the optical axis a of the laser beams 2 which is incident upon the apparatus frame 6. The mask unit 10 is arranged between the beam shaping optical system and Koehler illumination system 8a and the projection optical system 8b. Here, in consideration of the durability of the mask unit 10, it is desirable to use a contraction optical system. For the present embodiment, it is arranged to use a projection optical system 8b that performs contraction to ¼ power.

The work station 11 should desirably be provided with an appropriate adjustment means for adjusting the inclination of the work W with respect to the optical axis a described above. For example, it may be possible to structure the work station 11 by the combination of stages having freedom with respect to the three axes that are orthogonal to each other, and the five axes that rotate around two axes. By arranging the structure so that the center of rotational adjustment agrees with the processing center of a work W, it becomes possible to simplify the control of such adjustment means.

To position a work W on the work station 11, it should be desirable to arrange a plurality of reference pins for the jig 11a for mounting the work W on the work station 11. The pints abut upon the work W arranged on the work station 11. Also, on the jig 11a, a clamping mechanism which uses air suction or the like should be arranged besides the abutting mechanism. This clamping mechanism is put together with an automatic hand to carry out an automatic supply of work W to the work station 11. Further, a plurality of work pieces W are set on the work station 11 at a time so that a time required for carrying and mounting them is made shorter. In this case, however, one axis in the rotational direction of adjustment means cannot be placed on the center of the work W. Therefore, it becomes necessary to change the reference values at each time when measuring is performed and when the work should be moved.

The observation and measurement system 9 is formed by a pair of measurement instruments and a two-faced mirror 9d arranged on the optical axis a. Here, the observation instrument comprises a lens barrel 9a having an objective lens; a down light illumination source 9b incorporated in the lens barrel 9a; and a CCD camera sensor 9c connected with the lens barrel 9a.

Each of the measurement instruments, and mirror 9d are arranged between the projection optical system 8b and the work station 11. The mirror 9d is retracted from the optical axis a when laser is irradiated. Only when measurement is executed, it is caused to shift onto the optical axis a. For the present embodiment, the movement of the mirror 9d is controlled by means of an air cylinder mechanism.

To the information processing and controlling system 7, the positional data on a work W are fed back from the observation and measurement system 9, and the data on the beam power are fed back from the power detector 4. At first, the result of measurement by means of the observation and measurement system 9 is brought to the image processing system 7a per measurement instrument, and then, the result of signal processing is provided for the controlling system 7b. In accordance with the result of measurement described above, the controlling system 7b works out the distance in which the work W has moved, thus enabling the moving means 7c to shift the stage of the work station 11 accordingly. Then, when the value of the observation and controlling system 9 reaches a specific one, the positional adjustment of the moving means 7c is completed. The mirror 9d is retracted from the optical axis a, and signals are given for a specific period of time or a specific number of pulses to cause the laser oscillator 1 to emit laser beams 2. Meanwhile, the beam power information from the power detector 4 are fed back to the controlling system 7b to adjust the output given to the laser oscillator 1 through the interface 7d.

As the laser oscillator 1 used for the laser processing system, there are such high power ones as a YAG laser oscillator, $Co_2$ laser oscillator, excimer laser oscillator, $N_2$ laser oscillator, among some others. As the work W, polysulfonic resin is used, which is one kind of polymer resins. As the laser oscillator, Kr—F excimer laser oscillator is used, which is one of the excimer laser oscillators.

The work W to be processed is one of the parts that constitute an ink jet recording head used for an ink jet recording apparatus. More specifically, a second substrate 19 serving as the plate member for the ink jet recording head represented in FIG. 2 and FIG. 3.

Figure 2:
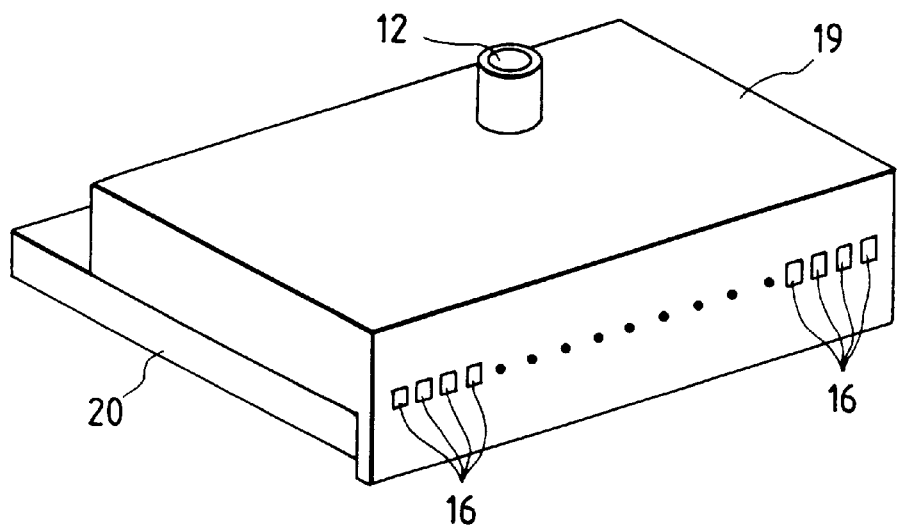
FIG. 2 is a perspective view which shows the parts of an ink jet recording head processed by the laser processing system represented in FIG. 1.
Figure 3:
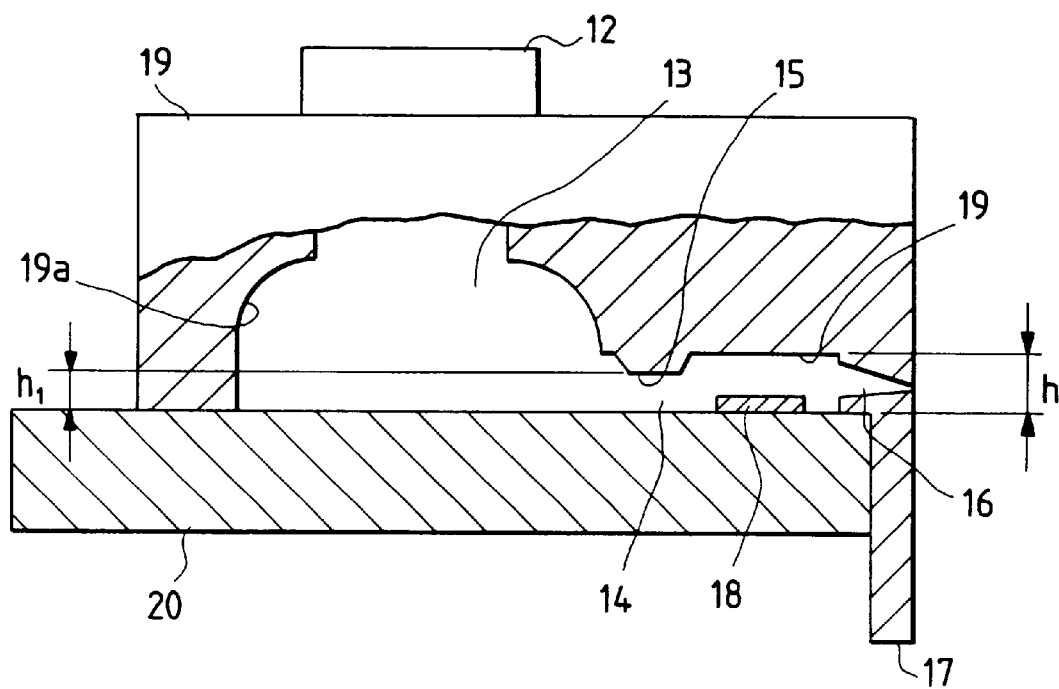
FIG. 3 is a cross-sectional view which shows the parts of the ink jet recording head represented in FIG. 2.

Here, in conjunction with FIG. 2 and FIG. 3, an ink jet recording head will be described. The ink jet recording head comprises a first substrate 20 formed by silicon on which energy generating devices are patterned to generate energy to be utilized for discharging ink, and the aforesaid second substrate 19 which is adhesively bonded to the first substrate 20. As the energy generating devices, electrothermal transducing devices 18 (heat generating resistors or the like) are used to generate thermal energy when applied voltage is supplied. A plurality of electrothermal transducing devices are arranged in parallel and formed by means of the film formation technology on the first substrate 20 together with the wiring of aluminum or the like that supplies electric power. On the second substrate 19, there are generally provided, grooves 19b, each formed corresponding to each of the electrothermal transducing devices 18 to constitute each of the ink flow paths 14 conductively connected with the ink liquid chamber 19, which will be described later; a recessed portion 19a that forms the ink liquid chamber 19a that temporality retains ink to be supplied to each of the ink flow paths 14; an ink supply opening 12 that induces ink from an ink tank (not shown) to the ink liquid chamber 13; and an orifice plate 17 having a plurality of discharge openings 16 arranged between the plate and the second substrate 19 corresponding to each of ink flow paths 14.

At the bottom near to the recessed portion 19a of each groove 19b that constitutes the ink flow path 14, an extruded portion 15 is arranged. The depth $h_1$ of the extruded portion 15 of the ink flow path 14 is made shallower than the depth h of the portion where an electrothermal transducing device 18 is arranged. This extruded portion 15 presents resistance to the ink flow in the ink flow path 14 so that the foaming energy of ink generated by the electrothermal transducing device 18 is not allowed to escape to the ink liquid chamber 13 side, hence enhancing the characteristics of ink discharges.

Since the ink jet recording head is structured as described above, thermal energy is generated by each of the electrothermal transducing devices 18 when electric power is supplied to each of the electrothermal transducing devices 18, respectively. By means of heat generated by such energy, film boiling is brought about in ink on the corresponding electrothermal transducing device to create each ink bubble in the ink flow path 14. By the development of this bubble, an ink droplet is discharged from the discharge opening 16.

As shown in FIG. 4, the groove 19b having the extruded portion 15 on the second substrate 19 (work W) described above is processed by the irradiation of laser beams 2 from the surface side bonded with the first substrate 20 (see FIG. 3) by means of the laser processing system described above. The discharge opening 16 is also processed by the laser processing system. In this respect, the discharge opening 16 may be processed before the processing of the groove 19b or may be processed after the processing of the groove 19b. In accordance with the present embodiment, after the groove 19b has been processed, the opening is processed from the groove 19b side by the irradiation of Kr—F excimer laser.

It is desirable to form the work W by means of injection molding using polysulfone, polyether sulfone, polyphenylene oxide, or other materials having excellent resistant to ink. In accordance with the present embodiment, the work is prepared by the formation using polysulfone injection molding. When processing the groove 19b, it is better to incline the work W slightly to the optical axis a in order to prevent the laser beams 2 from being interrupted by the presence of the orifice plate 17. In accordance with the present embodiment, the groove 19b is processed by inclining the work W at approximately 5 degrees to the optical axis a.

Figure 6A:
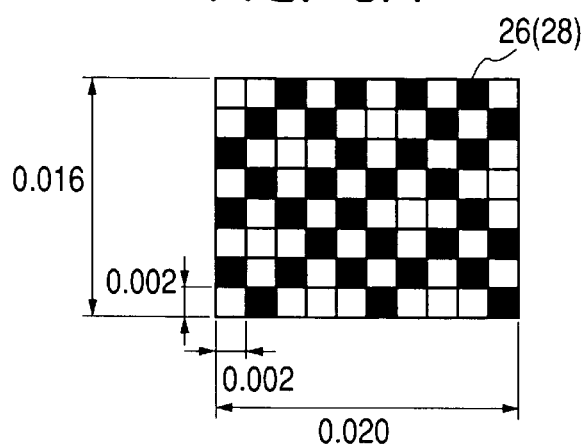
FIGS. 6A and 6B are enlarged front views which illustrate the section a of the mask unit and the groove pattern represented in FIG. 5, respectively.
Figure 6B:
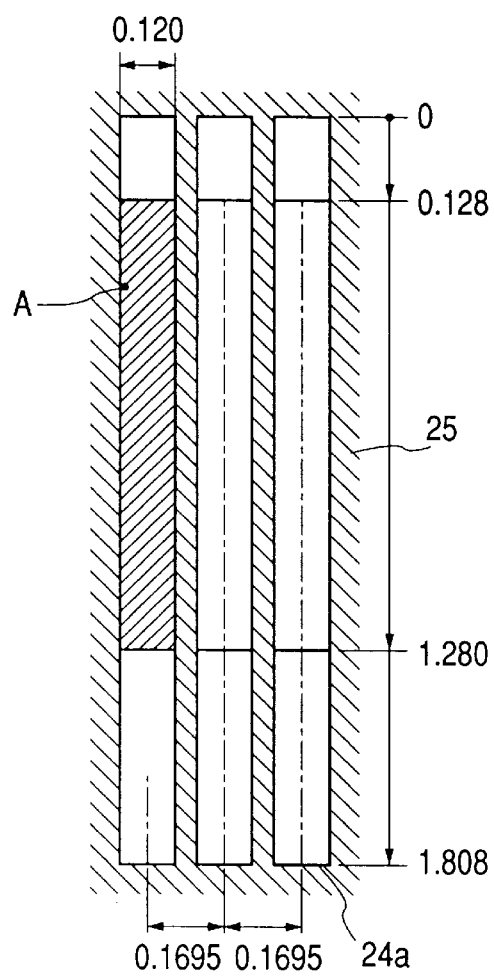

Now, in conjunction with FIG. 5 and FIGS. 6A and 6B, the description will be made of the structure of the mask unit 10. FIG. 5 is a perspective view showing the mask unit 10 represented in FIG. 1. FIGS. 6a and 6B are enlarged front views of the section a in FIG. 5.

In FIG. 5, a reference numeral 21 designates the plate member mounted on the apparatus frame 6 to be minutely movable in the directions of X, Y, and Z, and 22, a mask holder fixed to the plate member 21. The mask 23 is detachably held by the mask holder 22.

The mask 23 is provided with one or more patterns 24a of the groove 19b, which are formed in the size four times the pattern of the groove 19b. The laser beams 2 that are transmitted through the mask 23 are contracted to ¼ power by means of the projection optical system 8b (see FIG. 1) as described earlier. Therefore, the pattern of the groove 19b is focused on the work W in a desired size.

As the material of the mask 23, the synthetic quartz that allows the laser beams to transmit is used. The coating layer 25 that absorbs or reflects the laser beams is formed by deposited chrome layer.

In FIGS. 6A and 6B, a reference numeral 26 designates an extinct portion which is smaller than the quotient of the resolution and the aforesaid specific magnification of the projection optical system provided for the mask 23. Each extinct portion 26 is a square chrome layer having 0.002 mm for each side, and distributed by means of a pseudo-error diffusion pattern as shown in FIGS. 6A and 6B.

The section A indicates a rectangular zone of 0.020 mm×0.016 mm ((direction x)×(direction y) in FIGS. 6A and 6B) where the pseudo-error diffusion of the extinct portion 26 is provided. The pattern 24a of the groove 19b of the mask 23 is formed by six A zones in the direction x and 72 zones in the direction y.

As described earlier, the resolution of the projection optical system is 0.002 mm, and the specific magnification is ¼ power. Each extinct portion 26 is a square chrome layer having 0.002 mm for one side. Therefore, (the resolution of the projection optical system, 0.002)/(the specific magnification, ¼)=the chrome layer smaller than 0.008. This becomes 0.0005 mm on the surface of a work W. As a result, this portion is not focused on the work W. However, the laser beams become extinct reliably in this way.

By use of the structure and principle described above, the irradiation of 200 puls is given on the processing surface of a work with the concentration of energy being 1 J/cm·puls. Then, it becomes possible to form 200 grooves by means of one-time processing, each groove being the depth (h), 40 μm×the width, 30 μm×the length, 452 μm, at pitches of 42.5 μm, even with each portion of 288 μm whose depth (h1) is controlled to 25 μm (see FIG. 3). In this way, it is possible to obtain an ink jet recording head having excellent characteristics of ink discharges without reducing the productivity thereof.

(Embodiment 2)

FIGS. 7A to 7E are enlarged front views showing the section a (see FIG. 5) of the mask 23 of the laser processing system that implements the laser processing method in accordance with a second embodiment of the present invention. FIG. 7F is an enlarged view showing the groove pattern. FIG. 8 is a view schematically showing the ink flow path 14 on the second substrate 19 processed by means of the pattern 24b of the groove 19b.

As in the first embodiment, the pattern 24b of the groove 19b of the mask 23 is formed as follows:

Zone D (a pattern having eight extinct portions 26 of 2 μm×2 μm each in 3200 μm²), six in the direction x and three in the direction y;

Zone C (a pattern having 16 extinct portions 26 of 2 μm×2 μm each in 3200 μm²), six in the direction x and two in the direction y;

Zone B (a pattern having 24 extinct portions 26 of 2 μm×2 μm each in 3200 μm²), six in the direction x and three in the direction y;

Zone A (a pattern having 32 extinct portions 26 of 2 μm×2 μm each in 3200 μm²), six in the direction x and 67 in the direction y; and Zone E (a pattern having 48 extinct portions 26 of 2 μm×2 μm each in 3200 μm²), six in the direction x and 33 in the direction y.

A work W is processed as in the first embodiment using the pattern 24b of the groove 19b. Then, it is possible to form 200 grooves by means of one-time processing, each groove being the depth (h), 40 μm×the width, 30 μm×the length, 452 μm, at pitches of 42.5 μm, having the structure controlled to the depth of groove h2=50 μm, h3=30 μm, and h4=20 μm as shown in FIG. 8.

Figure 7A:
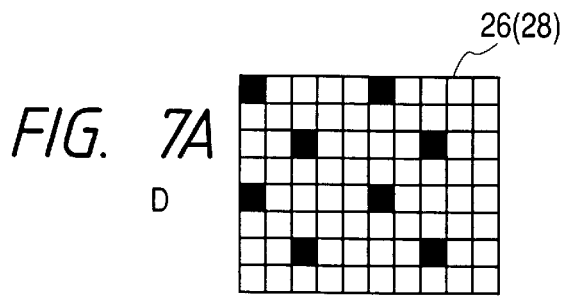
FIGS. 7A, 7B, 7C, 7D and 7E are enlarged views which illustrate the section a of the mask unit in accordance with a second embodiment represented in FIG. 5.
Figure 7B:
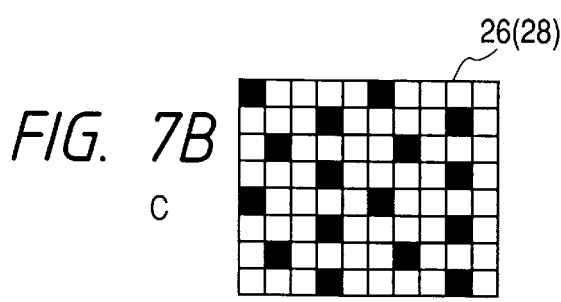
Figure 7C:
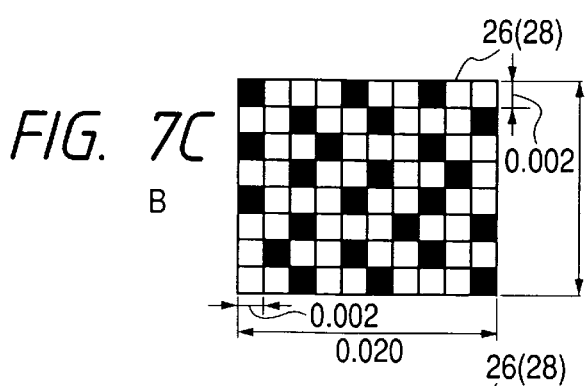
Figure 7D:
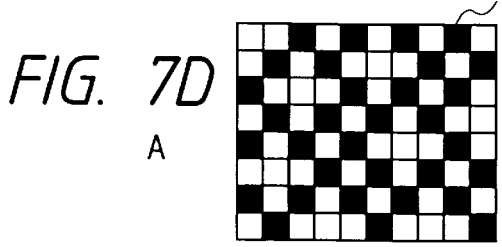
Figure 7E:
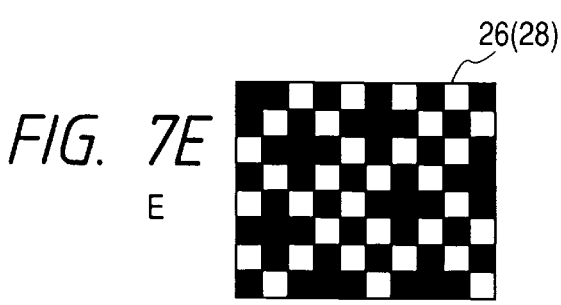
Figure 7F:
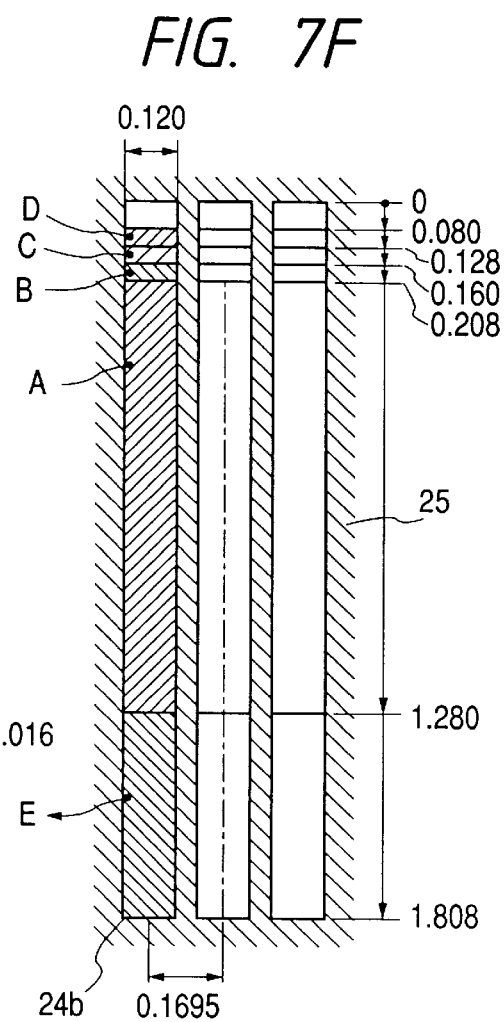
FIG. 7F is an enlarged view which shows the groove pattern in accordance with the second embodiment represented in FIG. 5.
Figure 8:
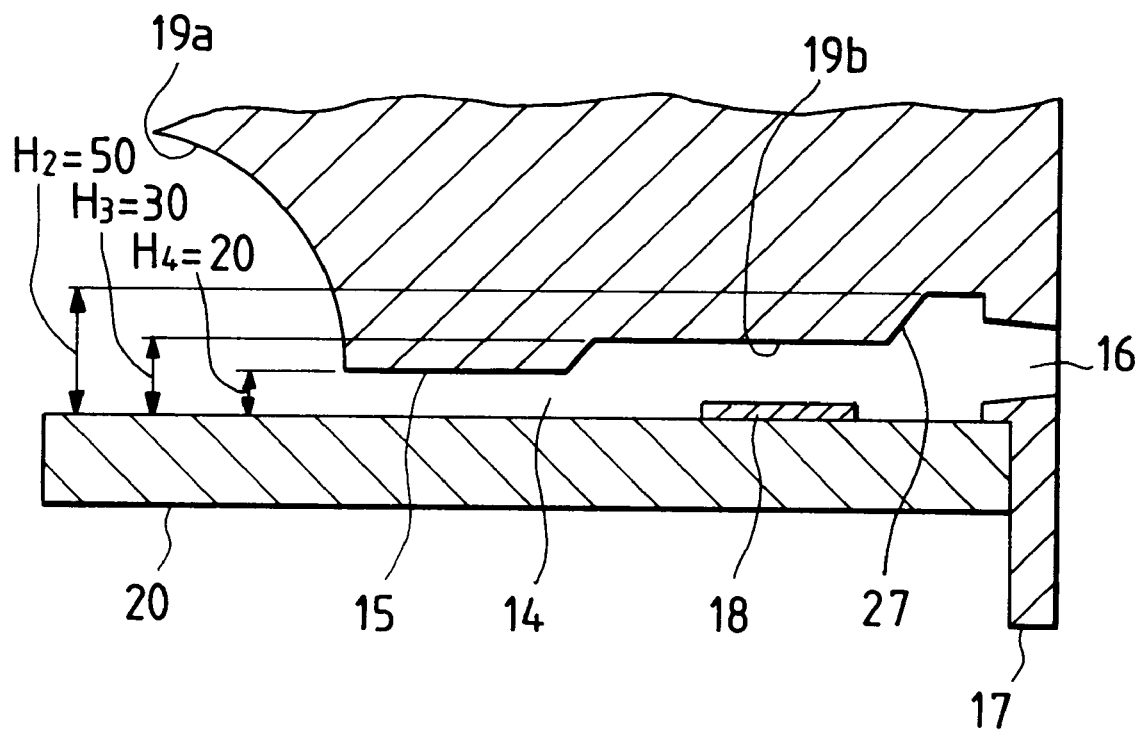
FIG. 8 is a partial cross-sectional view which illustrates the parts of the ink jet recording head processed by use of the mask unit in accordance with the second embodiment shown in FIGS. 7A to 7F.

The groove configuration thus produced has the structure formed by the D, C, and B sections shown in FIGS. 7A to 7C. Therefore, it becomes easier to form the inclined section 27 smoothly without any steps.

For the present embodiment, the transmissivity of the laser beams is allowed to change gradually by use of the structure formed by the D, C, and B sections, and the inclined portion 27 is formed smoothly without any steps. It is also possible to form the stepless and smoothly inclined portion 27 in such a manner that instead of using the structure formed by the D, C, and B sections of the present embodiment, the extinct portions 26 are so arranged that the transmissivity is reduced or increased gradually by the application of error diffusion method or the like, and that the transmissivity of laser beams gradually changes accordingly. With the mask of the present embodiment and the application of such method, it becomes easier to form a complicated three-dimensional configuration more smoothly by changing the transmissivity of the laser beams more precisely.

(Embodiment 3)

Figure 9A:
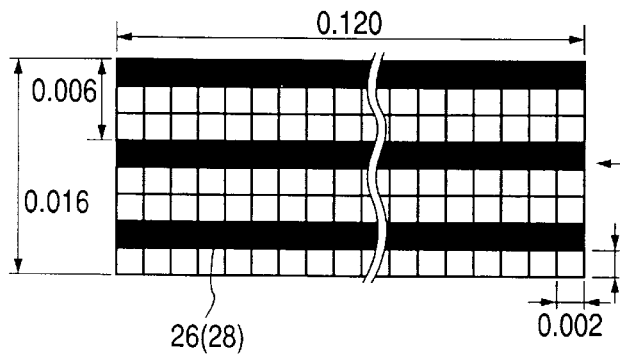
FIGS. 9A and 9B are enlarged views which illustrate the section a of the mask unit and the groove pattern in accordance with the embodiment represented in FIG. 5, respectively.
Figure 9B:
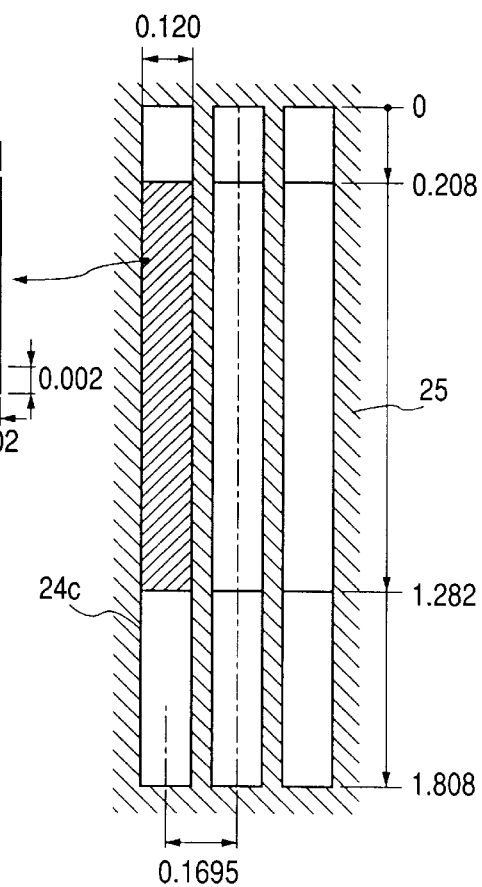

FIGS. 9A and 9B are enlarged front views showing the section a of the mask 23 of the laser processing system that implements the laser processing method in accordance with a third embodiment of the present invention, and the groove pattern as well. As in the first and second embodiments, the extinct portion is 0.002 mm×0.120 mm (the direction y×direction x in FIGS. 9A and 9B). No image can be focused in the direction y.

With the pattern 24c of the groove 19b formed to provide 179 of such extinct portions 26 at pitches of 0.006 mm, a work W is processed as in the first embodiment. Then, it is possible to form 200 grooves by means of one-time processing, each groove being the depth (h), 40 μm×the width, 30 μm×the length, 243.5 μm, at pitches of 42.5 μm, even with each portion whose depth (h1) is controlled to 28 μm. In this way, it is possible to obtain an ink jet recording head having excellent characteristics of ink discharges without reducing the productivity thereof as in the first and second embodiments.

(Embodiment 4)

Now, while quoting FIGS. 3, 6A and 6B, a fourth embodiment will be described. For the present embodiment, the same system as the first embodiment is used. A reference numeral 28 designates an extinct portion which is smaller than the quotient of the resolution and the aforesaid specific magnification of the projection optical system. The extinct portion is a square chrome layer of 0.012 mm×0.012 mm. The groove pattern is formed by means of error diffusion or arranged as in the first embodiment.

The resolution of process is 0.004 mm when the groove whose depth (h) is 40 μm is processed by use of the same system as in the first embodiment. The specific magnification is ¼ power. The extinct portion 28, which is smaller than the quotient of the resolution of the process and the aforesaid specific magnification, is the square chrome layer having 0.012 mm for one side, that is, the chrome layer smaller than 0.016=(the processing resolution, 0.004)/(the specific magnification, ¼ power). This layer becomes 0.003 mm on the surface of the work W, making it possible to focus image thereon. However, since this layer is smaller than the processing resolution, no process is effectuated, but only the resultant contrast is reduced.

With the structure and principle described above, the laser processing is executed in the same condition as in the first embodiment. Then, it is possible to form the groove whose depth (h1) is controlled to 25 μm by the one-time processing as in the first embodiment.

(Embodiment 5)

With respect to the second embodiment, the same effect is also confirmed in a case where instead of the extinct portion 26, the extinct portion 28 (which is the square chrome layer having 0.012 mm for one side) is used, this portion being smaller than the quotient of the resolution and the aforesaid specific magnification when the work is processed.

(Embodiment 6)

With respect to the third embodiment, the same effect is also confirmed in a case where instead of the extinct portion 26, the extinct portion 28 (which is the chrome layer of 0.012 mm×0.120 mm) is used, this portion being smaller than the quotient of the resolution and the aforesaid specific magnification when the work is processed.

In this respect, chrome is used for the coating layer 25 that absorbs or reflects laser beams for the first to sixth embodiments. However, aluminum, nickel, or phosphor bronze can be used instead. In any case, it is possible to obtain the same effect as the first to sixth embodiments.

Generally, as the fixed binarization method adoptable as a halftone representation method for a binary-coded recording, there are ones such as the random dither method, organized dither method, mean error minimizing method, mean value controlling method, dynamic threshold method, error diffusion method, multiplestage divisional quantization method, In-mesh pixel splitting method, random pattern method, organized density pattern method, and conditional decision method. As the adaptational binarization method, there are a method for discriminating image zones in accordance with the characterized quantities of circumferential pixels, and a method for discriminating image zones in accordance with the characterized quantities of orthogonal conversion or the like. For the embodiments described above, the description has been made of the use of error diffusion method (including pseudo-error diffusion) as its typical example. Here, however, the present invention is not necessarily limited to the error diffusion method. It is possible to materialize the objectives of the present invention by the application of any one of the above-mentioned methods of the fixed and adaptational binarization methods.

As described above, in accordance with the laser processing method of the present invention, the extinct portions of laser beams can be arranged in an arbitrary form on the pattern of mask. As a result, it is made possible to process complicated three-dimensional grooves having irregularities in the direction of laser irradiation smoothly without any steps by the execution of one-time processing of a work. It is also made easier to finely adjust the extinction of extinct portions, thus significantly enhancing the processing precision of the work.

Also, unlike the conventional method, there is no need for using plural numbers of masks in order to execute a multistage processing. Therefore, the processing costs of work is significantly reduced. At the same time, the processing system itself is built at lower costs.

Further, in accordance with the laser processing method of the present invention, it is possible to process a work so that three-dimensional grooves of a desired configuration may be processed in good precision. Therefore, when the processing object is the ink flow paths of an ink jet recording head, the configuration of the grooves that become such flow paths can be finished to be complicated three-dimensional one in good precision, which is best suited for controlling the flow of ink. Consequently, in accordance with the present invention, it is possible to obtain an ink jet recording head having excellent characteristics of ink discharges.

Also, an ink jet recording head of the present invention has excellent characteristics of ink discharges because it is manufactured by use of the laser processing method as described above.

Also, in accordance with the present invention, a system for manufacturing ink jet recording heads can implement the laser processing method described above to make it possible to obtain an ink jet recording head having excellent characteristics of ink discharges.

What is claimed is:

1. A system for manufacturing ink jet recording heads using a method comprising the steps of:

providing a mask having a predetermined pattern corresponding to a processing shape of a workpiece; and providing a projection optical system for imaging an image of the pattern of the mask on the workpiece using a predetermined magnification level, wherein the mask has a light permeating portion and a light shielding portion, the light permeating portion having a light reducing area, and wherein the light reducing area is formed by selectively providing a plurality of light shielding units each having an associated dimension that is smaller than a quotient of a resolution of the projection optical system and the predetermined magnification level.

2. An ink jet recording head manufactured by a laser processing method comprising the steps of:

providing a mask having a predetermined pattern corresponding to a processing shape of a workpiece; and providing a projection optical system for imaging an image of the pattern of the mask on the workpiece using a predetermined magnification level, wherein the mask has a light permeating portion and a light shielding portion, the light permeating portion having a light reducing area, and wherein the light reducing area is formed by selectively providing a plurality of light shielding units each having an associated dimension that is smaller than a quotient of a resolution of the projection optical system and the predetermined magnification level.

3. A laser processing system comprising:

a mask having a predetermined pattern corresponding to a processing shape of a workpiece; and a projection optical system for imaging an image of the pattern of said mask on said workpiece using a predetermined magnification level, wherein said mask has a light permeating portion and a light shielding portion, said light permeating portion having a light reducing area, and wherein said light reducing area is formed by selectively providing a plurality of light shielding units each having an associated dimension that is smaller than a quotient of a resolution of said projection optical system and said predetermined magnification level.

4. A laser processing system for irradiating a laser onto a workpiece through a mask having a predetermined pattern corresponding to a processing shape of the workpiece, comprising:

the laser; and the mask, wherein said mask has a light permeating portion and a light shielding portion, said light permeating portion having a light reducing area, and wherein said light reducing area is formed by selectively providing a plurality of light shielding units each having a dimension that is smaller than a quotient of a predetermined resolution and a predetermined magnification level.

5. A laser processing system according to claim 3 or 4, wherein said laser is a pulse ultraviolet laser.

6. A laser processing system according to claim 3 or 4, wherein said workpiece is a second substrate of an ink jet recording head having a first substrate provided with at least one liquid discharge energy generating element for discharging an ink and said second substrate has at least one groove defining an ink flow path, and said processing shape is a shape of the groove of said second substrate.

7. A laser processing system according to claim 6, wherein said light reducing area is a portion existing in the pattern of the groove of said ink jet recording head formed on said mask.

8. A laser processing system according to claim 3 or 4, wherein at least one of said light shielding units is irregularly located.

9. A laser processing system according to claim 8, wherein said at least one light shielding unit is irregularly located by using at least one of a fixed binary method and an adaptable binary method.

10. A system for manufacturing ink jet recording heads using a method comprising the steps of:

providing a laser; and providing a mask having a pattern and upon which a light from the laser impinges, the mask having a light permeating portion and a light shielding portion, the light permeating portion having a light reducing area, wherein the light reducing area is formed by selectively providing a plurality of light shielding units each having a dimension that is smaller than a quotient of a predetermined resolution and a predetermined magnification level of a projection optical system for forming an image of the pattern of the mask on a workpiece.

11. An ink jet recording head manufactured by a laser processing method comprising the steps of:

providing a laser; and providing a mask having a pattern and upon which a light from the laser impinges, the mask having a light permeating portion and a light shielding portion, the light permeating portion having a light reducing area, wherein the light reducing area is formed by selectively providing a plurality of light shielding units each having a dimension that is smaller than a quotient of a predetermined resolution and a predetermined magnification level of a projection optical system for forming an image of the pattern of the mask on a workpiece.

* * * * *